United States Patent

[11] 3,548,954

| [72] | Inventor | Dennis E. Lindemann<br>Gwinner, N. Dak. |
|---|---|---|
| [21] | Appl. No. | 671,335 |
| [22] | Filed | Sept. 28, 1967 |
| [45] | Patented | Dec. 22, 1970 |
| [73] | Assignee | Clark Equipment Company<br>Buchanan, Mich.<br>a corporation of Delaware. by mesne assignments |

[54] FOLDABLE CARRIAGE FOR EARTH WORKING IMPLEMENT
9 Claims, 9 Drawing Figs.

| [52] | U.S. Cl. | 172/311, 172/456 |
|---|---|---|
| [51] | Int. Cl. | A01b 73/00 |
| [50] | Field of Search | 172/311, 456; 280/411, 411.1 |

[56] References Cited

UNITED STATES PATENTS

| 2,828,597 | 4/1958 | Moore | 172/456X |
|---|---|---|---|
| 2,901,268 | 8/1959 | Christensen | 280/411.1 |
| 2,995,385 | 8/1961 | Lohrman et al. | 172/456X |
| 3,154,151 | 10/1964 | Zimmer et al. | 172/456 |
| 3,428,333 | 2/1969 | Nelson | 172/456X |

*Primary Examiner*—Robert E. Bagwill
*Assistant Examiner*—Alan E. Kopecki
*Attorney*—Frederick E. Lange, John J. Held Jr. and Eugene L. Johnson ABSTRACT: The invention relates to a hydraulically actuated foldable carriage for an earth working implement. The carriage may be folded from a wide field position to a narrow transport or storage position and includes features which provide for maximum safety and stability in storage, flexibility in traversing irregular terrain and toe-in adjustment of the outboard transport wheels.

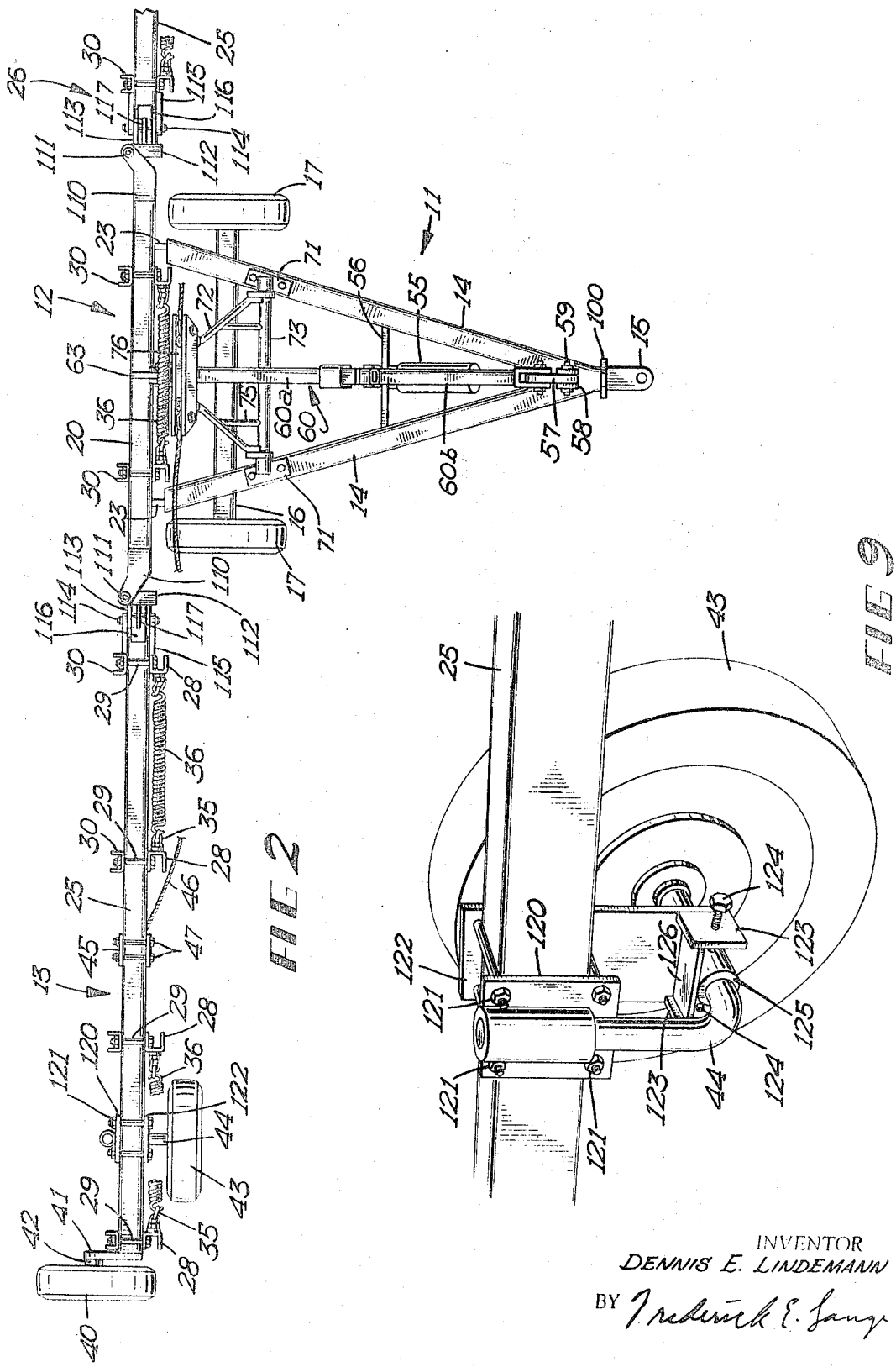

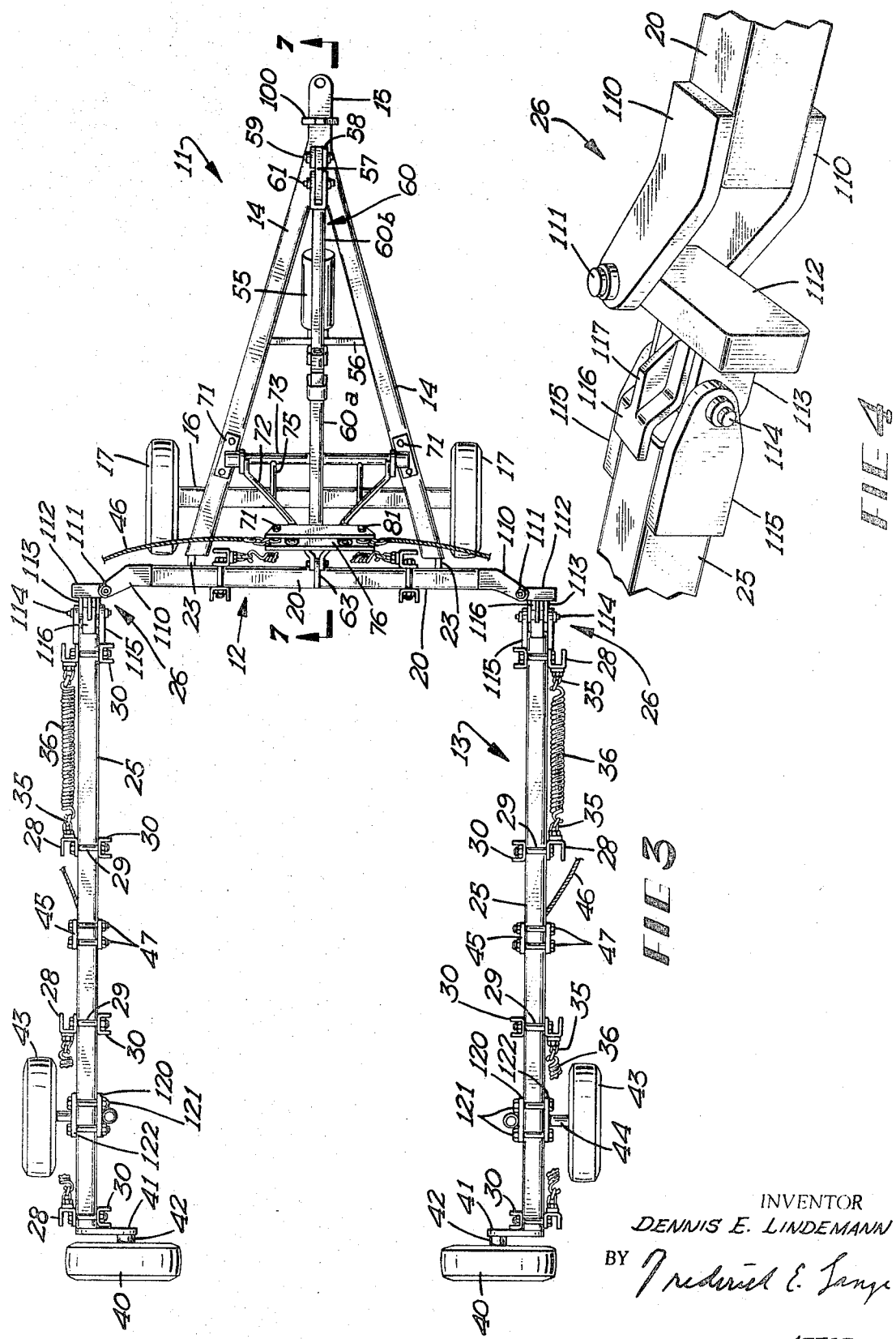

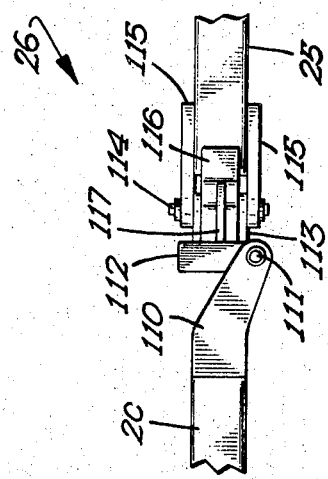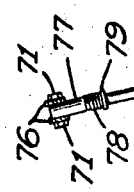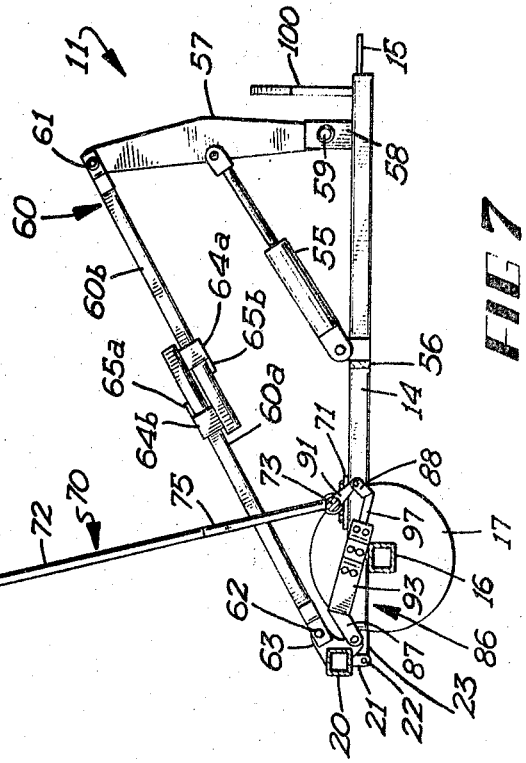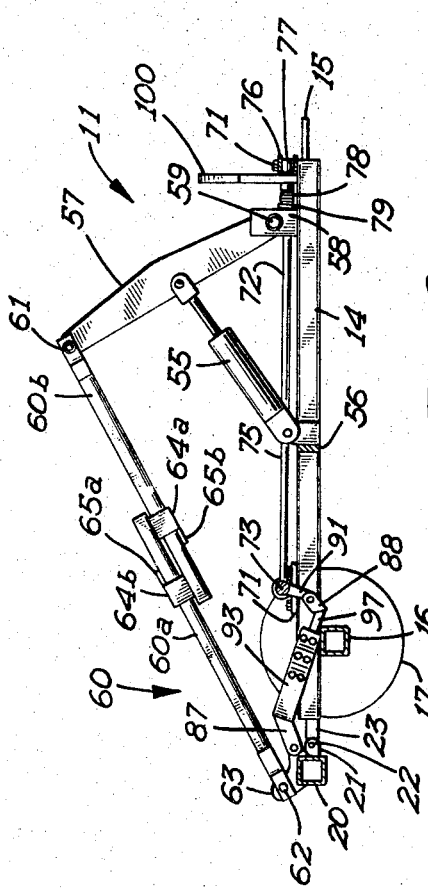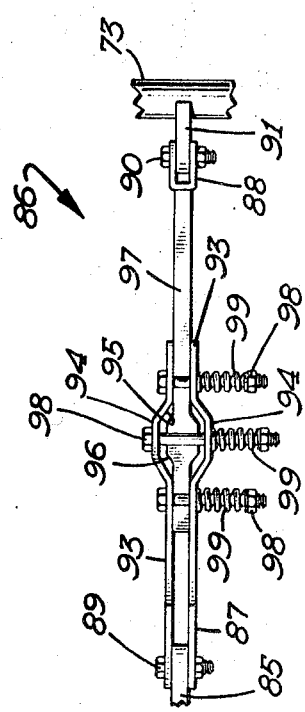

3,548,954

FOLDABLE CARRIAGE FOR EARTH WORKING IMPLEMENT

BACKGROUND OF THE INVENTION

The invention pertains to ground working implements and more particularly to foldable racks or carriages for such implements.

In traversing a field for agricultural purposes, such as plowing, discing, harrowing, mowing and cultivating, considerable time and money can be saved by decreasing the number of swaths necessary to cover a given area. In other words, the wider the swath, within limits, the more economical the operation. Consequently, implement carriages have been designed with considerable width, including widths of up to 55—60 feet. While highly desirable for field use, an implement of such width is not transportable on a highway, cannot be pulled through a normal fence gate, and requires an unduly large floor area for storage. Consequently, some method of breaking down the wide carriage into a more compact unit that is, folding the implement from its field position to a more compact transport position, must be devised to make transport and storage feasible.

Various designs of foldable implement carriages have been proposed and examples of such designs are provided by the following U.S. Pat: Worden 2,662,363; Moore 2,828,597; and Clark 2,944,615. In addition, a foldable implement carriage is disclosed in a Pat. application filed by Nelson, Apr. 26, 1966 and assigned Ser. No. 545,492. The present invention represents an improvement over the carriages disclosed in the above issued patents as well as the device disclosed in the Nelson application. More particularly, while the prior art devices have included hydraulic means for shifting from the transport position to the field position and vice versa, no means has been provided for insuring stability of the device when in the transport position. No means has been provided by the prior art devices for promoting flexing of the carriage when passing over irregular terrain and the prior art carriages do not provide for a selective and sensitive toe-in adjustment of the transport wheels when the carriage is in the transport position. The prior art devices have lacked stability at the joints or elbows in the transverse beam when in the transport or storage position. The unlimited universal pivoting of the joints leads to a lack of stability particularly when the tongue section is unattached from the towing vehicle and "jackknifed" with respect to the carriage. In such a position the prior art devices have a dangerous tendency to tip over. The prior art has the additional short coming of failing to provide a sufficient offset in the joints in the transverse beam to position the earthworking implements mounted to the wing beams sufficiently rearward of adjacent implements mounted to the center beam when in the transport position. Thus the teeth tend to collide and damage may result. The lack of such an offset in the joints in the transverse beam also prevents flexing or buckling of the transverse beam as the carriage traverses irregularities in the ground elevation, when in the field position. Moreover, the prior art patents do not provide for sensitive adjustment of toe-in of the outboard or transport wheels and, as a result, the angle at which the wing beam sections trail the center beam section, when the transport position, cannot be easily adjusted.

SUMMARY

The present invention solves many of the problems inherent in the prior art. Means for limiting the pivotal movement (about a horizontal axis when the transport position) of the joint between the center transverse beam and the wing beams is provided to lend stability to the apparatus when in the transport position. Offset means is also provided to allow for a buckling or flexing of the carriage when in the field position to compensate for irregularities in the surface over which the carriage is pulled and to insure that the implements attached to the wing beams are positioned sufficiently rearwardly of the implements attached to the center beams to avoid collision when the implement carriage is in the transport position. And means is also provided for adjusting the toe-in of the transport wheels to thereby allow an adjustment of the angle between the center transverse beam and the wing beams when in the transport position.

It is, accordingly, an object of the present invention to provide a hydraulically actuated implement carriage which has a wide field position and a narrow transport position and which has maximum stability in both the field and transport positions.

It is also an object to provide an implement carriage which is readily flexible when in the field position to compensate for variations and irregularities in the elevation of the ground surface over which the implement is pulled.

It is also an object to provide an implement carriage having means for insuring flexibility in the transverse beam when in the field position which also serves to position implements attached to the wing beam sections sufficiently rearwardly of the implements attached to the center beam section when the implement carriage is in the transport position.

It is also an object to provide an implement carriage in which the trailing angle of the wing beam sections may be sensitively adjusted by means of a toe-in adjustment of the transport wheels.

DESCRIPTION OF THE DRAWINGS

FIG. 2 is a plan view of the invention and shows the implement carriage in the intermediate position. The harrow tooth racks which form the implements associated with the embodiment of the carriage shown are not shown in FIG. 2. One wing beam is only partially shown.

FIG. 3 is a plan view of the invention with the implement carriage in the transport position. The harrow tooth racks are not shown.

FIG. 4 is a perspective view of the universal joint between the center beam and the wing beams and is shown in the intermediate position.

FIG. 5 is a sectional view taken on the line 5–5 of FIG. 1 and shows the universal joint between the center beam and the wing beam in the field position.

FIG. 6 is a sectional view taken on the line 6–6 of FIG. 1 and shows the hydraulic cylinder and linkage for pivoting the center beam and wing beams from the field position to the transport position and also shows the cable lift mechanism. In FIG. 6 the elements are shown in the field position.

FIG. 7 is a sectional view taken on the line 7–7 of FIG. 3 and shows the elements in the transport position.

FIG. 8 is a plan view of the slip clutch which serves in the cable yoke lifting linkage.

FIG. 9 is a perspective view of the transport wheels in the transport position and shows the wheel mounting and means for adjusting the toe-in thereof.

DESCRIPTION OF THE PREFERRED EMBODIMENT

Figure 1:
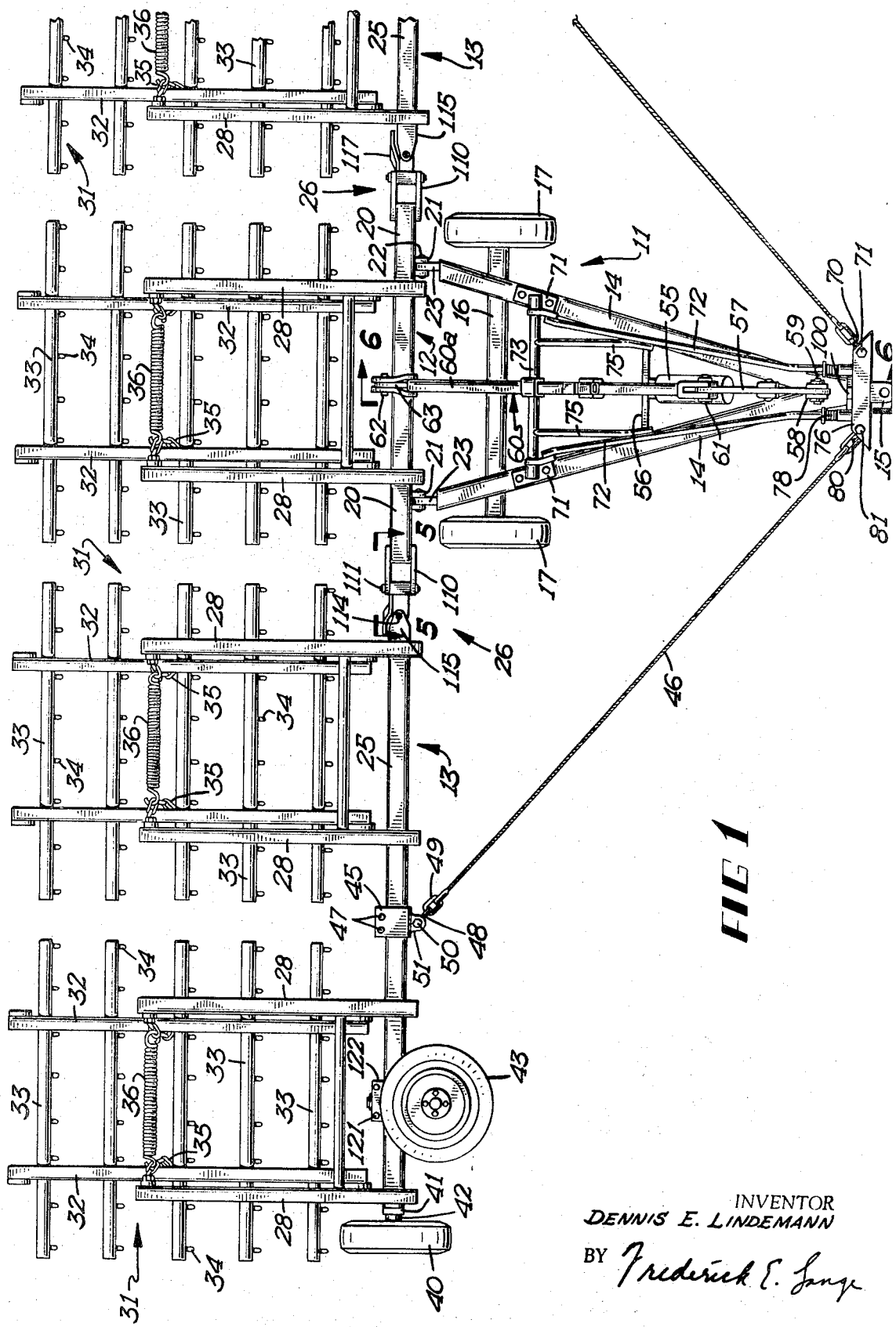
FIG. 1 is a plan view of the present invention and shows the implement carriage in the field position. One of the wing beam sections is only partially shown.

The invention may be generally understood with reference to FIGS. 1, 2 and 3. The foldable carriage has three basic positions: the field position shown in FIG. 1, an intermediate position shown in FIG. 2, and the transport position shown in FIG. 3. It includes a tongue section 11, a center beam section 12, and two wing beam sections 13. Tongue section 11 is wheel mounted and includes a pair of converging frame members 14, hitch 15, and axle 16. Axle 16 is welded to frame members 14 and rotatably supports tongue section wheels 17.

Center beam section 12 includes center beam 20 which is pivotally mounted with its longitudinal axis substantially perpendicular to the direction of travel of tongue section 11. Center beam 20 is pivotally mounted by means of parallel spaced brackets 21 which are pinned at pins 22 to rearwardly extending tabs 23 welded to each of the frame members 14. Thus center beam 20, as will be more particularly described below, may be pivoted about an axis extending through pins 22.

Wing beam sections 13 include a wing beam 25 which is universally pivotally mounted to center beam 20 at universal joint 26. Universal joint 26, described more particularly below, allows a universal pivoting of wing beam 25 with respect to center beam 20 except insofar as pivoting of the joint is limited by structure described in detail below.

Both center beam section 12 and wing beam sections 13 include a number of spaced implement arms 28 which are mounted to center beam 20, in the case of center beam section 12, and to wing beam 25, in the case of wing beam sections 13, by means of connectors 29 and backing channel plates 30, best seen in FIG. 2. In the illustrated embodiment, harrow racks 31 are suspended from implement arms 28. Harrow racks 31 include frame members 32 which serve as a means for mounting harrow tooth mounting members 33 in spaced parallel relationship. Harrow teeth 34 are mounted in spaced relationship in harrow tooth mounting members 33 to serve as ground working implements. Each harrow tooth rack 31 is suspended from a pair of implement arms 28 by means of chains 35. Coil springs 36 are provided to minimize swinging movement of each harrow tooth rack 31 when the vertical transport position.

It should be understood that harrow tooth racks 31 are but an example of one implement which may be suspended from implement arms 28. Other implements may also be used in connection with the foldable carriage without departing from the scope of the invention.

A field wheel 40 is rotatably mounted on the outer end of each wing beam 25. As best seen in FIG. 2, field wheel 40 is mounted to wind beam 25 by means of mounting plate 41 welded thereto and axle 42 secured to mounting plate 41. Each wing beam 25 is also provided with a transport wheel 43 which is rotatably mounted to wing beam 25 by means of axle 44, in a manner described more particularly below. Field wheels 40 engage the ground and are used when the implement is in the field position, shown in FIG. 1. Transport wheels 43 do not engage the ground when the implement is in the field position, but are used when the carriage is in the transport position shown in FIG. 3.

U-shaped brackets 45 mount a pair of cables 46 to wind beams 25. Cables 46 are secured to wing beams 25 by means of U-shaped brackets 45 which are seated around wing beam 25 and secured thereto by means of connectors 47. A clevis 48 is linked with ring 49 and secured by means of connector 50 to tab 51 of bracket 45 to complete the connection. Cables 46 serve to reinforce the transverse beam, consisting of center beam 20 and wing beams 25, at joints 26 when in the field position and when lifted, as described more particularly below, do not inhibit movement of the carriage from the field position to the transport position when such movement is required.

The carriage is moved from the intermediate to the transport position (FIGS. 2 and 3) merely by forward movement of tongue section 11. With transport wheels 43 in engagement with the ground, forward movement of tongue section 11 causes wing beam section 13 to pivot rearwardly about universal joints 26 and trial behind tongue section 11 to the position shown in FIG. 3. The carriage is moved from the transport position to the intermediate position (FIGS. 3 and 2) by rearward movement of tongue section 11 which causes spreading of wind beam sections 13 in a manner opposite to the movement from the intermediate to the transport position. The carriage is moved between the field position and the intermediate position (FIGS. 1 and 2) by means of a hydraulically actuated linkage described below.

The hydraulically actuated linkage may be best seen in FIGS. 6 and 7. In FIG. 6 the linkage is shown in the field position. In FIG. 7 the linkage is shown in the intermediate and transport position. The linkage includes means for pivoting center beam 20 about the axis extending through pins 22 and it also includes means for raising cables 46 to thereby slacken the cables to allow a rearward pivoting of wing beams 25 at universal joint 26.

The linkage for pivoting center beam 20 includes hydraulic cylinder 55 which is pinned at one end to cross member 56 which extends between frame members 14 of tongue section 11. Hydraulic cylinder 55 is pinned at the other end to a lifting arm 57 which is pivotally connected to frame members 14 of tongue section 11 at bracket 58 by means of pin 59. Lifting arm 57 is accordingly pivotable in a vertical plane perpendicular to the longitudinal axis of center beam 20 about the axis of pin 59. A telescoping tube 60, which includes two similar halves 60a and 60b, extends from pin 61 at lever arm 57 to pin 62 at center beam pivoting bracket 63. Telescoping tube 60 includes sleeve portions 64a and 64b. Stops 65a and 65b are provided to limit the extension of tube 60. While stops 65a and 65b limit the extension of tube 60, it should be noted that they do not limit the contraction or compressive movement of tube 60. As hydraulic cylinder 55 is extended and retracted, lifting arm 57 pivots about pin 58 and, through telescoping tube 60 and center beam pivoting bracket 63, center beam 20 is caused to pivot about the axis extending through pins 22. Thus center beam 20 may be pivoted from the field position shown in FIG. 6 to the transport position shown in FIG. 7 by means of the linkage described. In moving from the field position to the transport position center beam 20 is caused to pivot about the axis extending through pins 22 through an angular distance of about 90° to thereby pivot implement arms 28 from a horizontal plane to a vertical plane.

When hydraulic cylinder 55 is retracted with wing beams 25 in the intermediate position shown in FIG. 2, center beam section 12 is free to pivot downwardly by gravity as tube 60 moves rearwardly. Center beam section 12 pivots downwardly about the axis of pins 22 an angular distance of about 90° to move from the intermediate position of FIG. 2 to the field position of FIG. 1.

The hydraulic cylinder also serves as a means for raising and lowering cables 46 to thereby allow rearward pivotal movement of wing beams 25 about universal joint 26. For that purpose cable yoke 70, best seen in FIGS. 1, 6 and 7, is pivotally mounted to frame members 14 of tongue section 11 at sleeve brackets 71. Cable yoke 70, includes a pair of converging arms 72 which extend from transverse member 73, pivotally mounted in sleeve bracket 71, to yoke assembly 74. A pair of reinforcing members 75 is provided to reinforce the joint between converging arms 72 and a cross member 73. Yoke assembly 74 includes a rigid cable mounting link 76 which is slidably mounted to converging arms 72 by means of sleeves 77 which are seated on the ends of converging members 72. Coil springs 78 engage sleeves 77 at one end and flanges 79 at the other end to movably mount yoke assembly 74 to the ends of converging members 72. Cables 46 are attached to cable link member 76 by means of clevises 80 and connectors 81. Cable yoke 70 may be pivoted about the axis of cross member 73 from the field position shown in FIGS. 1 and 6, to the transport position shown in FIGS. 3 and 7 by means of a cable yoke lift linkage described below.

With reference to FIGS. 6—8, the cable yoke lift linkage includes a bracket attachment 85 formed integrally with center beam pivoting bracket 63. Bracket attachment 85 serves as a means for transferring rotational movement of center beam 20 about the axis of pins 22 to slip clutch 86 shown in FIGS. 6—8. Slip clutch 86 includes a pair of angularly offset mounting brackets 87 and 88 on opposite ends thereof. Bracket 87 is pinned at pin 89 to bracket attachment 85. Bracket 88 is pinned at pin 90 to bracket 91 which is welded to pivoting cross member 73 of cable yoke 70. Thus as center beam pivoting bracket 73 is caused to pivot about the axis of pins 22 by the action of hydraulic cylinder 55, force is applied to slip clutch 86 which is in turn applied to bracket 91 to pivot cable yoke 70 about the axis of pivoting cross member 73 from the field position shown in FIG. 6 to the intermediate or transport position shown in FIG. 7.

Slip clutch 86 may be best understood with reference to FIG. 8. It includes a pair of exterior clutch plates 93 each designed with an offset portion 94. The opposing offset portions 94 provide a caming surface 95 which is engaged by a complementary surface 96 formed integrally with clutch rod 97. Clutch rod 97 is welded to bracket 88. A series of connectors 98 extend through exterior clutch plates 93 in three pairs and each pair brackets clutch rod 97. Thus clutch rod 97 is free to slide in slip clutch 86 but is not otherwise free to pivot or rotate therein. Springs 99 are provided in association with connectors 98 to apply compressive force on clutch rod 97 through exterior clutch plates 93. Springs 99 allow a lateral expansion of the two exterior clutch plates 93. In the event that compressive force is applied to slip clutch 86 without a transfer of the force through movement of clutch rod 97, the clutch slips. In other words, if slip clutch 86 is actuated and clutch rod 97, due to its inability to move cable yoke 70, cannot move, the cam surface 96 of clutch rod 97 causes lateral expansion of exterior clutch plates 93 as it engages cam surface 95 and the force applied to slip clutch 86 is dissipated.

The dissipating action of slip clutch 86 described above, serves as a means for avoiding damage if hydraulic cylinder 55 is actuated while tension remains in cables 46. With tension in cables 46, cable yoke link 76 engages cable yoke link stop 100, as springs 78 are compressed, as best seen in FIG. 1. With cable yoke link 76 in compressive engagement with stop 100, considerable frictional forces are developed which cannot be overcome by force applied to link 91 (a comparatively short lever arm) through slip clutch 86. In such a situation, slip clutch 86 serves as a means for dissipating forces which would otherwise cause a break or deformation in the linkage between center beam pivoting bracket 63 and cable yoke 70.

Universal joint 26 may be best understood with reference to FIGS. 3—5. With reference particularly to FIG. 4, universal joint 26 includes offset brackets 110 which are welded to center beam 20 and serve to position pin 111 in a vertical position offset rearwardly of the axis of center beam 20 when the latter is in the intermediate or transport position shown in FIGS. 2—4. Universal joint 26 includes an intermediate block 112 which accepts pin 111 at one end and provides a means for mounting brackets 113 which in turn accept pin 114 with its axis extending perpendicularly to the axis of pin 111. Brackets 115 are welded to wing beam 25 to pivotally connect wing beam 25 to universal joint 26 at pin 114. Thus, wing beam 25 may be universally pivoted with respect to center beam 20 since it may pivot in a horizontal plane about the axis of pin 111 and in a vertical plane about the axis of pin 114.

Pivotal movement about pin 114, however, is limited by the presence of plate 116 which serves as a means at universal joint 26 for limiting the pivotal movement of wing beam 25 about the horizontal axis of pin 114, when center beam 20 is in the intermediate or transport position. Plate 116 is welded to intermediate block 112 and brackets 113 and further rigidity is provided by rib 117. Thus any attempt to pivot wing beam 25 about the axis of pin 114 toward plate 116 will result in an engagement between the wing beam 25 and plate 116. Plate 116 thus serves as a stop to prevent such pivotal movement of wing beam 25.

The stopping effect of plates 116 on each of the universal joints 26 is particularly important when the invention is in the transport position shown in FIG. 3. Plates 116 lend stability to the carriage which would not otherwise exist. In the absence of plates 116, with the carriage in the transport position, when hitch 15 is disconnected from the towing vehicle, the dead weight applied to tongue section 11 rearwardly of axle 16 is not supported and the tongue is free to move upwardly, pivoting about the axis of tongue section wheels 17. The upward movement may be dangerous to the operator unhitching the apparatus from the towing vehicle. Plates 116 limit the pivotal movement at joints 26 and prevent upward pivotal movement of tongue section 11. Moreover, if tongue section 11 is canted or "jackknifed" with respect to wing beams 25 (when in the storage position), upward pivotal movement of tongue section 11, in the absence of plates 116, results in a decrease in the stability of the carriage to the point where the apparatus tips over and requires a substantial amount of effort to return it to its upright position. Plates 116, accordingly, provide a limit on the pivotal movement about pins 114 thereby making the apparatus less dangerous to unhitch and more stable. They prevent upward pivotal movement of tongue section 11 about the axis of tongue section wheels 17 and eliminate the tendency of the carriage to tip over when in the transport position with the tongue section "jackknifed."

The offset bracket 110, described above, has a dual function. With the carriage in the transport position, shown in FIG. 3, offset bracket 110 serves to position the harrow tooth racks of wing beam sections 13 rearwardly of the racks of center beam section 12. Thus interference between the harrow tooth racks in the vicinity of universal joint 26 is minimized when the carriage is in the transport position.

With the carriage in the field position shown in FIGS. 1 and 5, offset bracket 110 insures that the buckling force applied to center beam 20 through wing beams 25 by the tension in cables 46, passes above pin 111. Accordingly, the tendency to buckle at universal joint 26 is limited to a tendency to pivot wing beams 25 upwardly about pins 111 and does not include the reverse tendency to pivot wing beams 25 downwardly about pins 111. The design provides for a flexibility in the carriage which alleviates compressive forces in center beam 20 and wing beams 25 when tongue section 11 and center beam section 12 are drawn through a depression while wing beam sections 13 pass over higher ground adjacent the depression. In such a situation, wing beams 25 are free to buckle upwardly about pins 111 while tongue section 11 and center beam section 12 remain in contact with the depressed ground. Thus the carriage may be drawn through a ditch in the field position without undue compressive forces applied to center beam 20 and wing beams 25 as a result of tension in cables 46.

The transport axle may be best understood with reference to FIG. 9. Transport wheel 43 is rotatable on axle 44 which is pivotally mounted to wing beam 25 by means of sleeve bracket 120. Sleeve bracket 120 is secured to wing beam 25 by means of connectors 121 and backing plate 122. Backing plate 122 extends downwardly, when wing beam 25 is in the transport position, a distance sufficient to extend beyond axle 44 which is accommodated by an opening (not shown) in plate 122. Backing plate 122 serves as a means for mounting stop plates 123 which are threadably engaged with stop screws 124. A bushing 125 rotatably engages axle 44 and rests against bearing plate 126. Axle 44 accordingly, may be adjusted for toe-in by means of stop screws 124. In other words, the angle between the axis of rotation of transport wheel 43 and the axis of wing beam 25 may be varied from the perpendicular within a range of roughly 85° to 95° by the adjustment of stop screws 124. The toe-in adjustment controls the angle between center beam 20 and wing beams 25 when the latter trail behind center beam 20 with the invention in the transport position.

OPERATION

While the general operation of the present invention is apparent from the foregoing description, the more detailed aspects of operation are explained below.

Field to Transport Position

To move from the field position (FIG. 1) to the transport position (FIG. 3), the carriage is first backup slightly to slacken cables 46. The slackening of cables 46 removes the compressive force applied to spring 78 and cable yoke link 76 is pushed from engagement with stop 100. Hydraulic cylinder 55 is then extended to pivot lifting arm 57 upwardly about pin 59 from the position shown in FIG. 6 to the position shown in FIG. 7. As hydraulic cylinder 55 is extended, telescoping tube 60 pivots center beam 20 about the axis of pins 22 from the position shown in FIG. 6 to the position shown in FIG. 7. As center beam 20 is pivoted about the axis of pins 22, wing beams 25 also pivot about the same axis and field wheels 40 are disengaged from the supporting surface as transport wheels 43 pivot downwardly to engage the supporting surface. Harrow racks 31 move from the horizontal position shown in FIG. 1 to the vertical position shown in FIG. 2.

Simultaneously, compressive force is applied to slip clutch 86 at slip clutch bracket 85. The compressive force is transmitted through slip clutch 86 to bracket 91 welded to pivoting cross member 73 of cable yoke 70. Cable yoke 70 is pivoted upwardly from the position shown in FIG. 6 to the position shown in FIG. 7 to raise and further slacken cables 46.

At this point the carriage is in the intermediate position shown in FIG. 2. As tongue section 11 is drawn forward, wing beam sections 13 pivot about pins 111 of universal joint 26 and eventually assume the trailing position shown in FIG. 3. With wing beam sections 13 in the trailing position, movement from the field position to the transport position is complete.

Transport to Field Position

To move from the transport position (FIG. 3) to the field position (FIG. 1) the carriage is first backed-up a substantial distance to spread wing beam sections 13 from the trailing position shown in FIG. 3 to the intermediate position shown in FIG. 2. Hydraulic cylinder 55 is then retracted to move lifting arm 57 from the position shown in FIG. 7 to the position shown in FIG. 6. Telescoping tube 60 releases center beam 20 from transport position of FIGS. 2 and 7 and center beam 20 pivots downwardly about the axis of pins 22 to the position shown in FIG. 6. The downward pivoting of center beam 20 is caused by gravity acting primarily upon harrow rack 31 suspended from implement arms 28 mounted to center beam 20. As center beam 20 pivots about the axis of pins 22, wing beams 25 also pivot about the same axis. Field wheels 40, accordingly, are pivoted into engagement with the supporting surface and transport wheels 43 are pivoted out of engagement with the supporting surface. As center beam 20 pivots, tensile force is applied to slip clutch 86 and that force is transmitted to bracket 91 which causes cable yoke 70 to pivot downwardly about the axis of pivoting cross member 73 from the position of FIG. 7 to the position of FIG. 6. At this point, movement from the transport position to the field position is complete.

Use

When in use, in the field position, a number of the features described above find application. The offset in universal joint 26 brought about by offset brackets 110, provides the advantage described above, that is, a flexing or buckling of the wing beams with respect to the center beam. In the transport or storage position, offset brackets 110 position the harrow tooth racks 31 of wing beam sections 25 sufficiently rearwardly of harrow tooth racks 31 of center beam 20 to avoid collision.

When in use in the transport position, transport wheels 43 may be adjusted for toe-in by adjusting screws 124. Thus, the trailing angle of wing beams 25 may be adjusted to narrow the overall width of the apparatus when in the transport position.

When in the storage position plates 116 prevent pivotal movement of wing beams 25 upwardly about pin 114 to lend stability to the carriage as described above.

I claim:

1. A foldable carriage for an earth working implement comprising:

a tongue section;

wheel means connected to said tongue section;

a center beam mounted to said tongue section for pivotal movement about a horizontal axis transverse to the longitudinal axis of said tongue section;

a pair of wing beams respectively, universally pivotally mounted to each end of said center beam to thereby define a universal joint at each end thereof;

means mounted to said tongue section and operatively connected to said center beam for pivoting said center beam about said horizontal axis through an angular distance of substantially 90° to thereby define a field position and a transport position;

means operative when said center beam and wing beams are in said field position, and operatively extending between said wing beams and said tongue section for preventing rearward pivotal movement of each of said wing beams about a vertical axis at said universal joint;

a transport wheel mounted to each of aid wing beams at a point spaced from said universal joint for supporting each of said wing beams; and means at each of said universal joints for limiting the upward pivotal movement of said wing beam with respect to the horizontal axis of said universal joint when said wing beam is in said transport position, said horizontal a axis of said universal joint when said wing beam is in said transport position being rearward of the axis of rotation of said wheel means.

2. The foldable carriage of claim 1 wherein each of said universal joints includes an axis offset downwardly with respect to said center beam when said center beam is in said field position.

3. The foldable carriage of claim 1 wherein said transport wheel mounted to each of said wing beams includes means for angularly adjusting the position of the axis of rotation thereof in a horizontal plane to thereby adjust the toe-in of each of said wheels when said carriage is in said transport position.

4. The foldable carriage of claim 1 wherein said transport position of said wing beams includes a trailing position, said trailing position being defined by each wing beam extending rearwardly from said center beam and at approximately right angles thereto, and wherein said means at each of said universal joints for limiting pivotal movement thereof is operative when said carriage is in said transport position to limit the upward movement of the forward end of said tongue section.

5. The foldable carriage of claim 1 wherein said means at each of said universal joints for limiting pivotal movement thereof comprises: a plate mounted to said universal joint is a substantially horizontal plane with said joint in said transport position, said plate being spaced above and extending horizontally across said horizontal pivot axis of said universal joint, to contact a portion of said wing beam and thereby limit pivotal movement of said joint about said horizontal axis of said universal joint.

6. The foldable carriage of claim 2 wherein said transport wheels include means for angularly adjusting the position of the axis of rotation thereof, to thereby adjust the toe-in of said transport wheels.

7. The foldable carriage of claim 4 wherein each of said universal joints includes an axis offset downwardly with respect to said center beam when said center beam is in said field position.

8. The foldable carriage of claim 4 wherein said transport wheels include means for angularly adjusting the position of the axis of rotation thereof, to thereby adjust the toe-in of said transport wheels.

9. The foldable carriage of claim 6 wherein said transport position of said wing beams includes a trailing position, said trailing position being defined by each wing beam extending rearwardly from said center beam and at approximately right angles thereto, and wherein said means at each of said universal joints for limiting upward pivotal movement of said wing beam thereof comprises: a plate mounted to said universal joint in a substantially horizontal plane with said joint in said transport position, said plate being spaced above and extending horizontally across said horizontal pivot axis of said universal joint, to contact a portion of said wing beam and thereby limit the upward movement of the forward end of said tongue section.